(12) United States Patent
Desai

(10) Patent No.: US 7,206,344 B1
(45) Date of Patent: Apr. 17, 2007

(54) METHOD AND APPARATUS FOR DISPLAYING VIDEO

(75) Inventor: Pratish R. Desai, Fremont, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 0 days.

(21) Appl. No.: 09/559,712

(22) Filed: Apr. 26, 2000

Related U.S. Application Data (60) Provisional application No. 60/174,464, filed on Jan. 5, 2000.

(51) Int. Cl.
*H04N 7/12* (2006.01)

(52) U.S. Cl. .............. 375/240; 375/240.01; 375/240.12

(58) Field of Classification Search ............... 375/240, 375/240.01, 240.12; 345/418, 723, 810; 725/37; 348/143; 386/70, 125, 105; 369/4
See application file for complete search history.

(56) References Cited

U.S. PATENT DOCUMENTS 5,600,368 A * 2/1997 Matthews, III ............. 348/143
5,602,596 A * 2/1997 Claussen et al. ............. 725/37
5,917,781 A * 6/1999 Kim ............................. 369/4
6,078,328 A * 6/2000 Schumann et al. ......... 345/418
6,128,432 A * 10/2000 Lee ............................. 386/70
6,141,004 A * 10/2000 Jeong ........................ 345/723
6,415,101 B1 * 7/2002 deCarmo et al. ........... 386/105
6,469,718 B1 * 10/2002 Setogawa et al. .......... 345/810
6,728,477 B1 * 4/2004 Watkins ...................... 386/125

FOREIGN PATENT DOCUMENTS

EP         0 889 649 A2 *  1/1999

* cited by examiner

*Primary Examiner*—Allen Wong
(74) *Attorney, Agent, or Firm*—Beyer Weaver LLP (57) ABSTRACT

A method and apparatus for displaying different presentations of program material allows various presentations of a DVD movie, for example, to be displayed on a display for a user's selection. The various presentations might involve different angles from which a user must select or different chapters from which a program should begin. The selection of a presentation is facilitated by displaying the various options on a single display such that the user can quickly choose which presentation to choose. Furthermore, audio is provided with chapter presentations to assist a user in selecting a chapter from where playback should be initiated.

11 Claims, 7 Drawing Sheets

METHOD AND APPARATUS FOR DISPLAYING VIDEO

This patent application claims the benefit of U.S. Provisional Application No. 60/174,464, filed Jan. 5, 2000, which is hereby incorporated by reference.

BACKGROUND OF THE INVENTION

This invention relates generally to the presentation of audio/visual material. More particularly, this invention relates to the presentation of different versions of an audio/visual program or the presentation of different locations in a program so as to allow a user to select a preferred presentation.

In the past, audio/visual (AV) programs such as movies, television shows, music videos, video games, training materials, etc. have typically involved a single play version of the program. The user would begin play of the program and watch the program from beginning to end. A single presentation was implemented in displaying the program. A user did not have any option to view the program from a different angle, with a different soundtrack, in a different language, with subtitles, etc. because the video could not accommodate multiple options. However, with the introduction of DVD technology, a user now has greater options to choose from. A storyline in a movie, for example, can be shot from different angles and stored as different versions on a DVD storage medium. Similarly, a movie might be sold with optional language tracks. Thus, a viewer could decide to watch the movie with a French language track rather than English, for example. As another example, a movie might be presented with different endings. Thus, a user could select a preferred ending option before playing the movie. However, there is a need to present these different options to a user that removes the need for any specialized codes or difficult programming steps. In addition, there is a need for a system that allows a user to implement these options during the playback of an AV program, rather than at the beginning. For example, if a sporting event is being shown and one angle of view is generally preferred by the viewer, that angle of view can be selected at the beginning of the program. However, if a play would be seen more easily from another angle, it would be desirable to allow the viewer to change the angle of presentation to one of the different angles to view the play. The determination of when the different angle should be implemented would occur during the normal playback of the program. Thus, there is a need for a system that allows this choice to be made easily during normal playback as well as in an easy manner.

Also, it has been possible through the use of VCR's to fast forward or reverse through a video to select a point in time during the video from which to begin viewing. This allowed one to fast-forward through portions of the AV program that already had been viewed at an earlier date or were simply not of interest to the viewer. A user had to physically scan through the video in order to try and determine a new location from which to begin viewing. However, this was a lengthy process that involved a lot of hit or miss trial and error. As a result, it was easy for a viewer to go too far in a video and skip over unseen material. Therefore, there is still a need for a system that gives a viewer a choice or a preview of different sections of an AV program in an automatic or efficient manner, so that the user can easily find the area of interest in the program.

In providing choices to a viewer, other systems have been limited by the way in which alternatives are presented. There is a need for a system that provides a user with a stronger association between the option being presented and the symbol used to represent that option.

SUMMARY OF THE INVENTION

The present invention provides a method and apparatus for displaying AV material having several different possible presentations. A datastream of information for the different AV presentations is received; a first AV presentation is displayed in normal playback mode; an alternative AV presentation is also displayed; and a user is permitted to select a desired AV presentation for display. The method can be implemented using a circuit that has an input to receive the datastream of information for the different presentations; a decoding circuit operable to decode the information of the datastream so as to output a signal for displaying the first presentation of the program; a selection circuit that is operable to re-configure the decoding circuit so that the decoding circuit decodes the datastream so as to display a second presentation of the program; and a receiver that is configured to receive an input from a user that indicates a desired presentation for display.

Another embodiment of the invention provides a method and apparatus for receiving a datastream comprised of information for a plurality of presentations of an AV program; displaying a first presentation of the program in normal playback mode; then, displaying an alternative presentation of the program in normal playback mode; and permitting the user to select a desired presentation of the program.

One embodiment of the invention provides a method of receiving a datastream comprising information for displaying the AV program; playing audio of a first portion of the program while displaying video of that portion; playing audio of a second presentation of the program while playing video of that section; and permitting the user to select from which portion of the program normal playback should be initiated. With this embodiment, different chapters of a movie, for example, can be displayed for the viewer's selection of where playback should be initiated.

The various embodiments of the invention provide alternative enhancements such as converting a displayed video section to graphics for display during playback of an alternative video presentation; highlighting one of several displayed options so as to allow a user to select one of the options; implementing normal playback of one presentation while continuing with a display of alternative presentations; updating the alternative presentations to coincide with a new portion in the primary presentation being displayed.

Thus, the different embodiments of the invention are advantageous for a variety of reasons. For example, a viewer can now choose from a variety of options of how program material is presented. The viewer is given greater freedom of choice in playing back program material in a manner that pleases the viewer such as from a different angle. Furthermore, this choice can be made during normal playback of a program; it need not be made at the beginning of the program. In addition, various options can be presented such that a user can easily select a presentation. Similarly, a user need not rely on codes or inputting a series of numbers; rather, the viewer's choice is made easier by actually showing a portion of the program from the various alternatives and allowing the user to immediately identify each option and make a selection.

Other and further advantages and features of the invention will be apparent to those skilled in the art from a consideration of the following description taken in conjunction with the accompanying drawings wherein certain methods and apparatuses for practicing the invention are illustrated. However, it is to be understood that the invention is not limited to the details disclosed but includes all such variations and modifications as fall within the spirit of the invention and scope of the appended claims.

BRIEF DESCRIPTION OF THE DRAWINGS

This 1 shows a flowchart for one embodiment of the invention that illustrates how several different presentations of a program are presented for a user's selection.

DESCRIPTION OF THE SPECIFIC EMBODIMENTS

Figure 1:
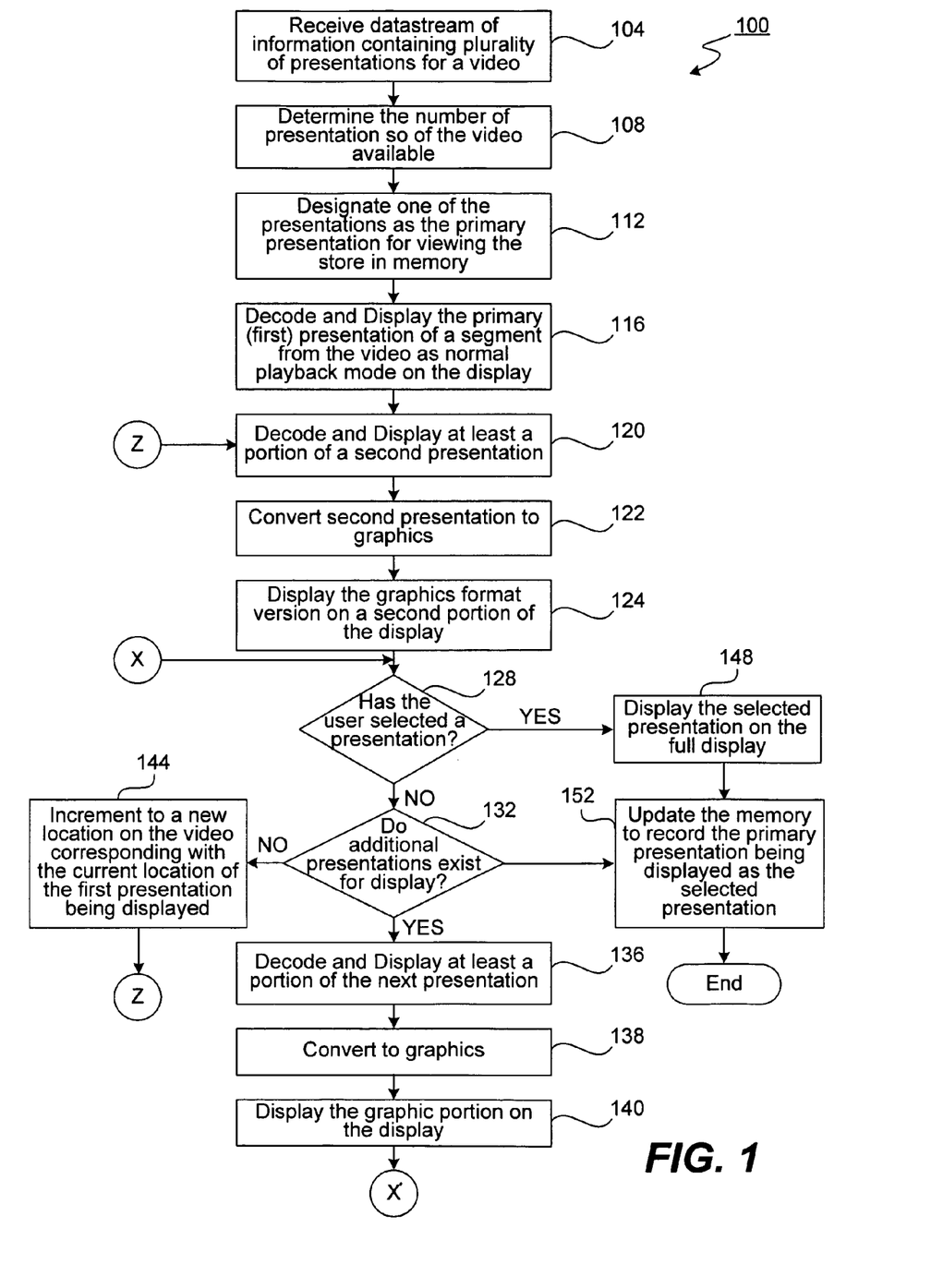

Referring now to the figures and more particularly to FIG. 1, a first embodiment of the invention can be seen. FIG. 1 illustrates a flowchart 100 in which a variety of presentations of a program can be viewed by a user and then selected by the user. Such presentations might include different camera angles from which a movie is filmed, different language tracks for a movie, different graphics or difficulty levels for a video game, different subtitle settings for a movie, etc. They might even include the option of different combinations of the above. For purposes of explaining this embodiment of the invention, FIG. 1 will be described with reference to a movie which was filmed from different angles and from which the user can choose in order to select an angle presentation from which the movie should be displayed. However, it should be understood that other types of program material other than a movie as well as other presentation characteristics other than the angle from which a movie is filmed could also be implemented by the invention.

Figure 3:
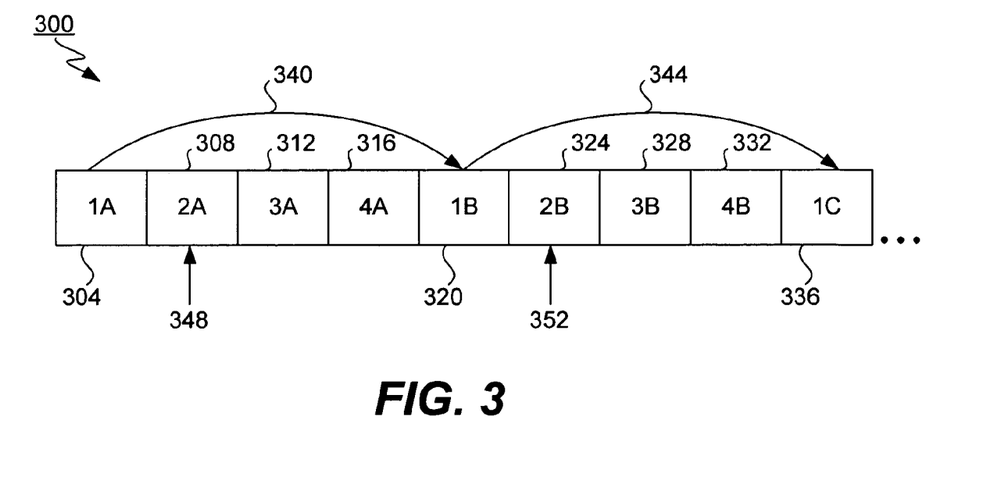
FIG. 3 shows a sample DVD datastream having four alternative presentations for displaying the same program.
Figure 10:
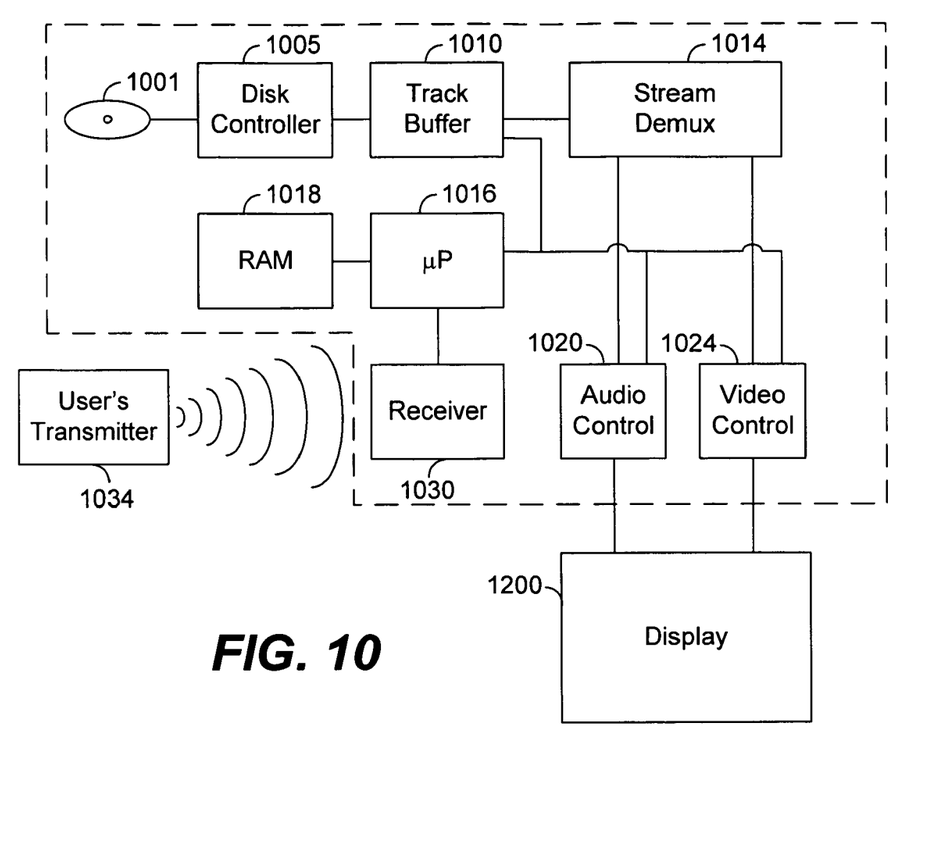
FIG. 10 shows an apparatus for implementing the invention according to the flowcharts shown in Figures and 1,4, and 7.

In FIG. 1, a datastream is received by a circuit such as that shown in FIG. 10. Preferably the datastream is an MPEG-2 formatted datastream containing DVD information. However, other similar formats and conventions could be utilized as well. A portion of the datastream is shown in FIG. 3. As can be seen in FIG. 3, the data segment 300 is comprised of several interleaved video object units known as ILVUs, namely data blocks 304, 308, 312, 316, 320, 324, 328, 332, and 336. These ILVUs contain information for displaying the program material at different camera angles. Thus, by playing the material in ILVUs 304, 320, and 326, a first angle is presented as normal playback.

The flowchart shows that as the datastream is received, the total number of available presentations of the video encapsulated by the datastream is determined 108. This can be accomplished by a processor which processes header information indicating how many presentations are included with the DVD material. Then, one of the presentations (e.g., camera angles) is designated as a primary presentation. Preferably, this will be the first presentation, namely ILVU blocks 1A, 1B, 1C, etc. in FIG. 3. This designation as to which presentation is the primary presentation is then stored in memory 112.

Once a primary camera angle is selected, information from the datastream is collected for that camera angle. Thus, the track buffer shown in FIG. 3 is preferably controlled by the microprocessor to buffer ILVUs 304, 320, and 336. The other ILVUs shown in FIG. 3 apply to other camera angles; thus, they would not be needed. This data in the track buffer for use in displaying the first camera angle would then be decoded from its MPEG-2 format for output for display. Typically, audio and video outputs would be utilized to output the information to a display. This can be seen in FIG. 2 in which the display of the primary presentation is shown as the primary display 204 on a portion of the display 200.

Figure 2:
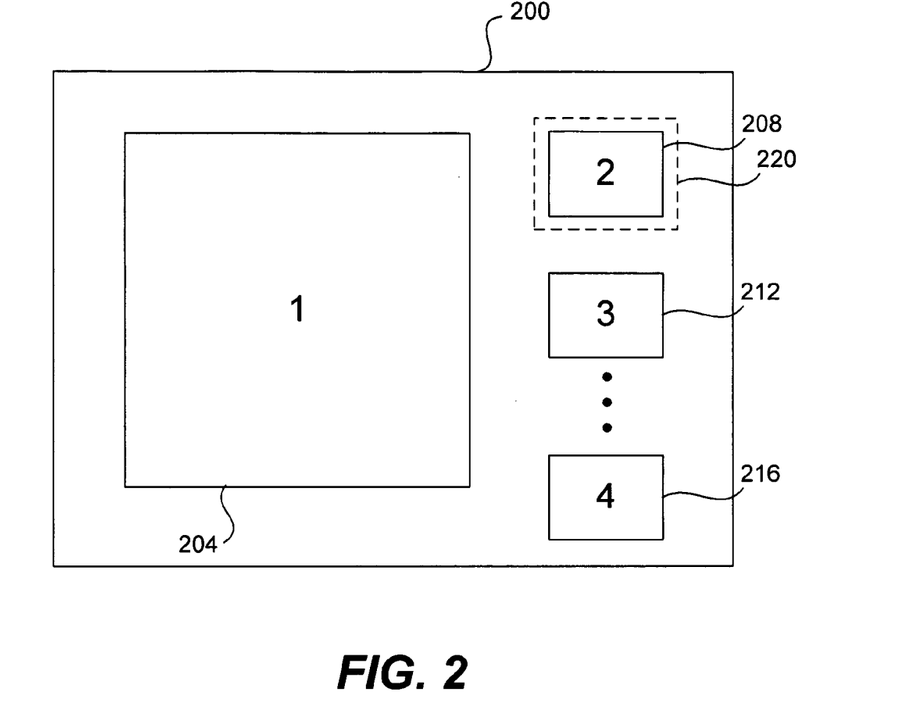
FIG. 2 shows an example of a display that can be used by the method illustrated in FIG. 1 to present different presentations of a program for a user's selection.

Next, a second presentation of the program material is decoded and displayed 120. Preferably, this is accomplished simultaneously with the display of the primary presentation as shown by FIG. 2 where portion 204 of the display represents the primary presentation and portion 208 of the display represents a second presentation. In typical DVD players, however, the limited resources to decode and display a first presentation will prevent simultaneous display of a second presentation. Therefore, the DVD player will need to wait until resources permit the gathering and processing of data for displaying the second presentation. Thus, this presentation may need to occur intermittently as resources permit. Consequently, it might be more practical to simply gather enough data for a singular frame of video representing the second camera angle. This camera angle could then be decimated and converted to a 16 bit per pixel image 122 for display as a graphics image on the display 124. Thus, a variety of different implementations could be used to present the second camera angle on the display.

Normally when collecting data from a DVD disc, the processor will cause the pickup to jump from ILVU 1A to ILVU 1B to ILVU 1C as shown in FIG. 3 by lines 340 and 344. However, the gathering of data for a frame can be accomplished by having the processor not skip from 1A to 1B; but rather, if resources permit, scan ILVU 2A. This will allow the pickup to obtain the information for the second presentation if resources permit. Thus, by simply monitoring resources such as memory, the track buffer, processor use, etc. one can determine when an appropriate time exists to gather information for the second presentation.

With two camera angle choices available to the user, namely the first presentation displayed on the screen and the graphic of the second presentation displayed on the screen, a user is in a position to make a selection. Thus, a determination is made as to whether the user has selected a presentation 128. Of course such a selection could come at an earlier point in time as well.

If the user has not made a selection, a check is made to see if additional camera angles exist for display 132. If more camera angles do exist, information for display of those camera angles are presented as well 136. Again, the processing resources may limit how much of the presentation can be displayed. If the MPEG encoding of the primary display is very simple, e.g., a repeating scene of a blue sky, then greater resources will be available to process the next presentation for display. Thus, data can be gathered as described above in regard to the second presentation and decoded and displayed 136. Similarly, the presentation can be converted to graphics format 138 and displayed on the screen 140. The process is then repeated until no more alternative presentations exist for display or until the user selects a new camera angle from which to view. These alternative presentations are shown in FIG. 3 as display portions 208, 212, and 216.

It is preferred to allow the primary presentation to play at normal forward view. Thus, the processor is preferably configured to play the primary camera angle at normal playback while the additional presentations are intermittently presented as resources permit. Therefore, after a first group of alternative presentations are displayed, new presentations can be presented corresponding with the current point in the program being displayed by the primary presentation. Consequently, the alternative presentations are essentially incremented to a new location corresponding with the current location of the first presentation being displayed 144. Then, the process is repeated such that new scenes from the movie are displayed corresponding with the different camera angles.

While a user might simply press a button labeled with a number on the user's remote control in order to select a displayed angle to view, the option can be enhanced by circling the various displayed angles with a graphic pointer 220 as shown in FIG. 2. For example, the graphic pointer 220 could simply be a flashing white square surrounding the graphic image that displays the second presentation of the movie. Thus, a user could push the enter button to select that view when it was surrounded by the flashing marker. After a time period, the flashing square would move to the next camera angle view and flash around it.

Figure 4:
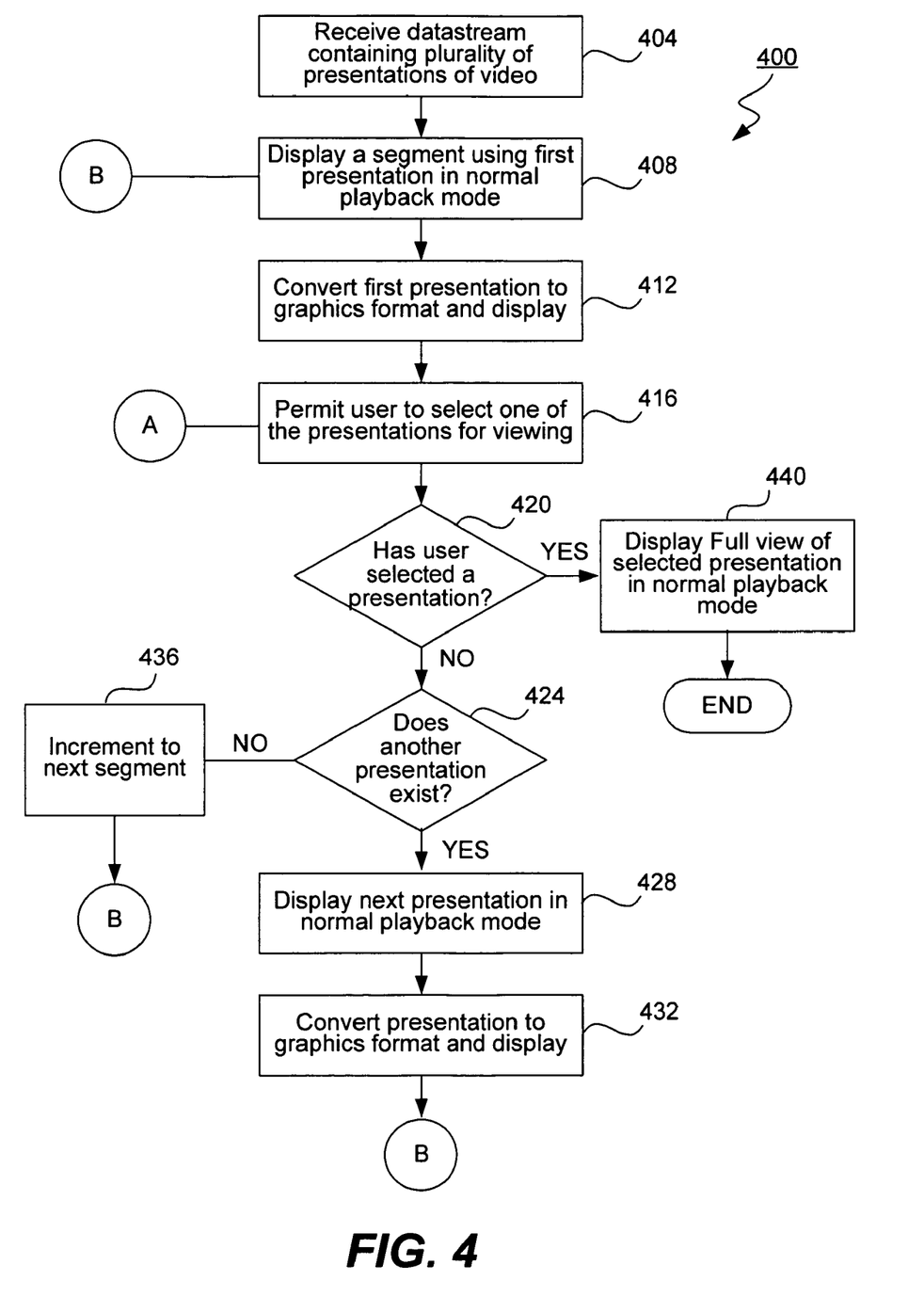
FIG. 4 shows a flowchart for another embodiment of the invention that illustrates how several different presentations of a program are presented one by one for a user's selection.
Figure 5:
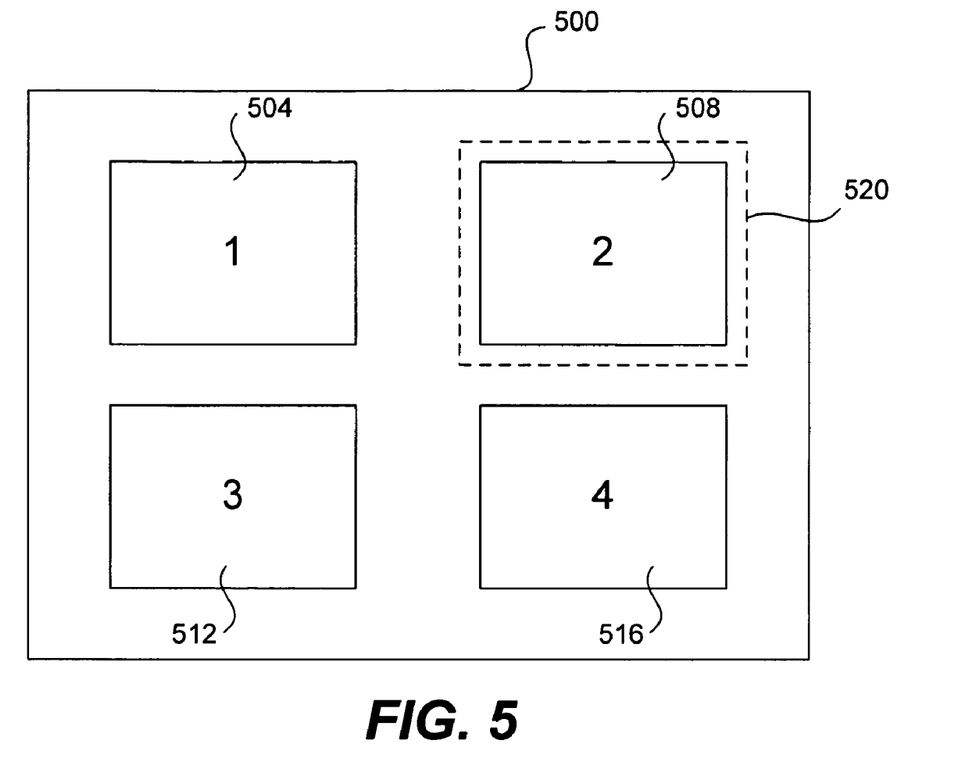
FIG. 5 shows an example of a display that can be used by the method illustrated in FIG. 4 to present different presentations of a program for a user's selection.

FIG. 4 shows another embodiment of the invention in flowchart 400. Once again, for purposes of this example, a movie filmed in alternative camera angles will be used as the example to demonstrate the various presentations available. Once again, a datastream containing a plurality of presentations for the AV program is received 404, e.g., camera angles for a movie. Then, a first camera angle is displayed on a portion of the display 408. This can be seen in FIG. 5 in which display portion 504 of display 500 is used to display the first camera angle presentation. Then, the first camera angle presentation is converted to a graphics format and displayed 412 on display portion 504. At this point, the user has the option to select the displayed presentation for full display viewing 416. Consequently, a test is made to see if the user has made a selection 420. If no selection has been made, then a test is made to determine whether another presentation exists 424. As one of ordinary skill in the art would understand, this can be accomplished by checking header information contained in the datastream. If another camera angle presentation does exist, then that camera angle presentation is accessed, decoded and displayed in normal playback mode 428. A pre-determined time segment is preferably displayed that is sufficient to allow a highlight of the camera angle presentation. The presentation is displayed on portion 508 of display 500. This presentation is then converted to graphics and displayed in graphics format. The process is then repeated: allowing the user to select a presentation and displaying additional presentations, e.g., display presentations 512 and 516 in FIG. 5, in normal playback speed in a cyclical fashion.

Figure 6:
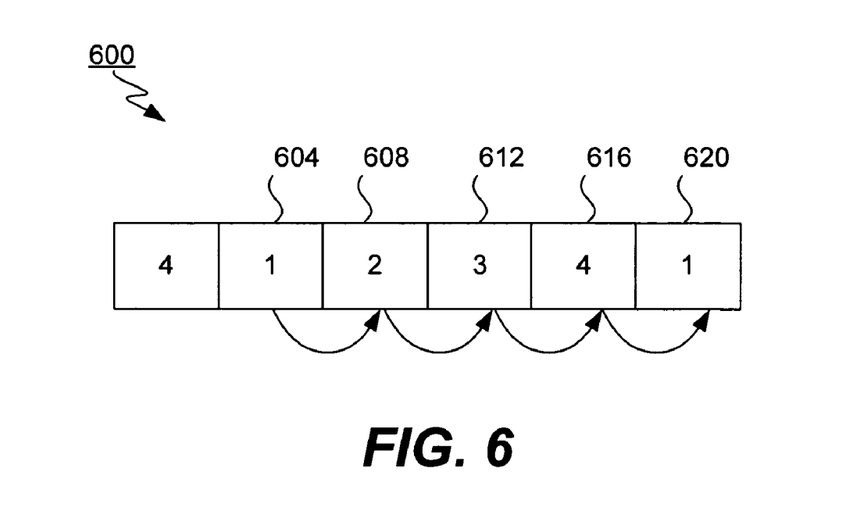
FIG. 6 shows a sample of a DVD datastream as implemented by the flowchart of FIG. 4.

This is symbolically represented in FIG. 6. FIG. 6 shows that a first block of data 604 for a first presentation is accessed, decoded and displayed. Then, the second block 608 is accessed, decoded and displayed as demonstrated by arrow 624. Similarly, blocks 612 and 616 are accessed, decoded and displayed. Once all presentations have been displayed, the process can be repeated by incrementing to the next segment in the movie 436, e.g., starting with block 620. Alternatively, the process could be repeated by not incrementing and simply starting again with block 604. Thus, this embodiment allows the display to show the different angles in a cyclical manner such that each angle can be seen at normal forward speed. Thus, it is a solution for a processor with limited resources that can only display one angle at normal full speed; yet it provides a way for all angles to be presented for a viewer's selection. Once a user does select a camera angle presentation for viewing, then that camera angle can be displayed as a full screen view 440.

A variety of different time sequences can be used in this embodiment of the invention. For example, the different presentations could all represent the same (i.e., contemporaneous) segment in time for the movie, e.g., the same explosion in an action movie filmed from different angles. Alternatively, the different presentations could represent sequential segments in time such that the second presentation follows the segment displayed by the first presentation, etc. Similarly, the different presentations could represent overlapping sequences in time.

In addition, these various presentations can be highlighted as explained above for the previous embodiment to facilitate the choice of camera angle by the user. Similarly, in creating a graphics representation, it is not necessarily important to capture an entire frame. One might simply choose to capture a portion of a frame. In presenting the various camera angle presentations, one can optionally play the audio associated with the video aspect of the camera angle.

Figure 7:
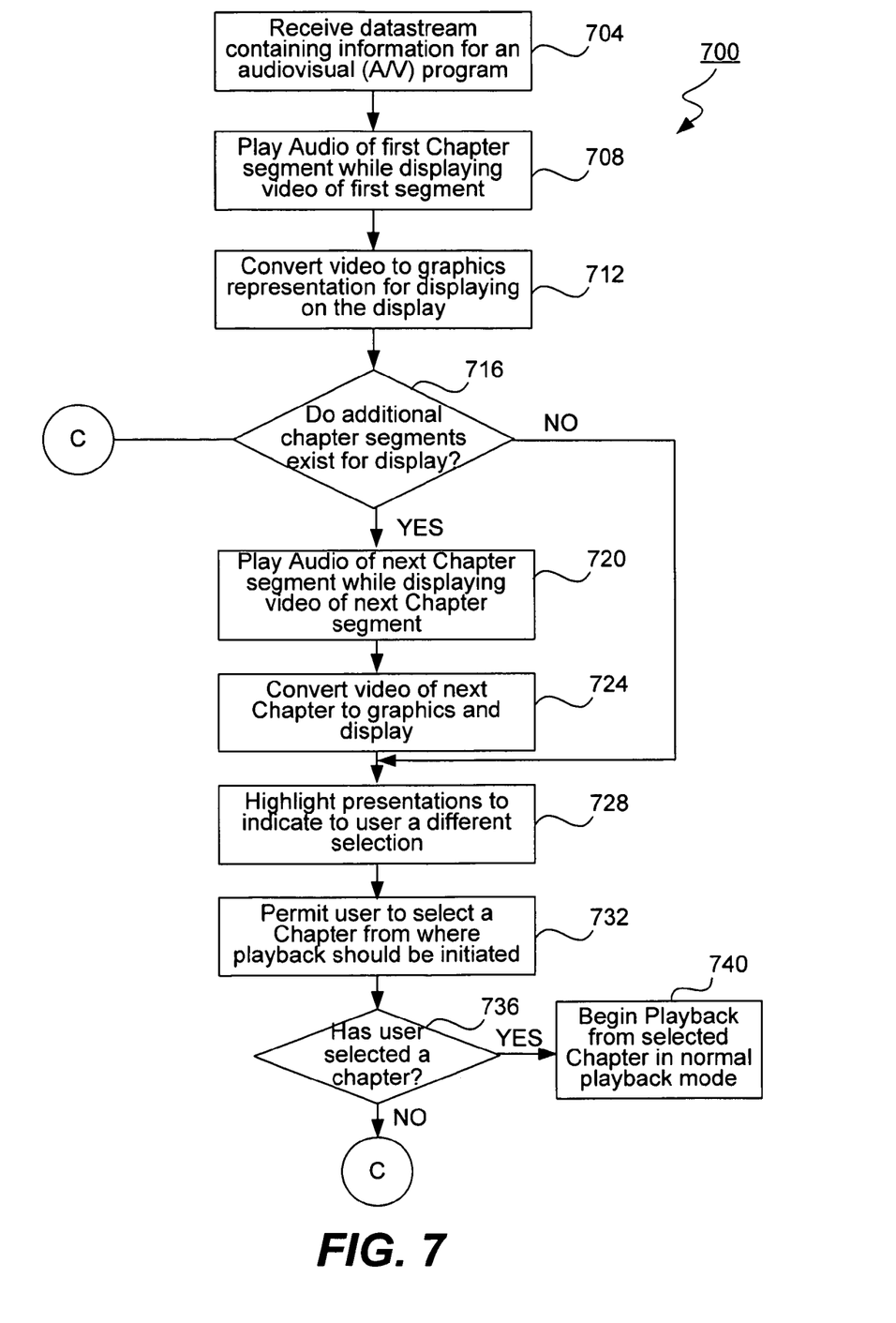
FIG. 7 shows a flowchart for an embodiment of the invention that allows a user to select from a series of locations in the time sequence of a program, e.g., chapters of a movie.

Another embodiment of the invention can be seen in FIG. 7. Many DVD formatted programs are divided into chapters that represent, for example, equal time segments of a movie. Rather than a pure time division aspect, a subject matter aspect might be associated with chapters for a program. Regardless, the chapter allows the viewer to determine from where playback should begin. Thus, the present invention is useful in displaying various chapters for a viewer's review. In addition, it is useful in that it allows the associated audio with a chapter segment to be displayed as well.

In the flowchart 700 of FIG. 7, a datastream comprising information for the AV program is received 704. This datastream is then decoded such that a presentation of a first segment, i.e., first chapter, of the program is displayed with its associated audio track 708. This first presentation is shown as video display portion 801 on display 800 in FIG. 8. The first presentation is then converted to a graphic format, e.g., by decimating a screen of the presentation and converting that to a 16 bit per pixel graphic image. Then, that graphic image is displayed on the display 712. A test is then made to determine whether additional chapter segments exist for display 716. If another chapter segment exists for display, then that chapter segment is decoded and displayed 720, e.g., on screen portion 802 of screen 800. Then, a video image for the chapter segment can be converted to a graphic image and displayed 724.

Figure 8:
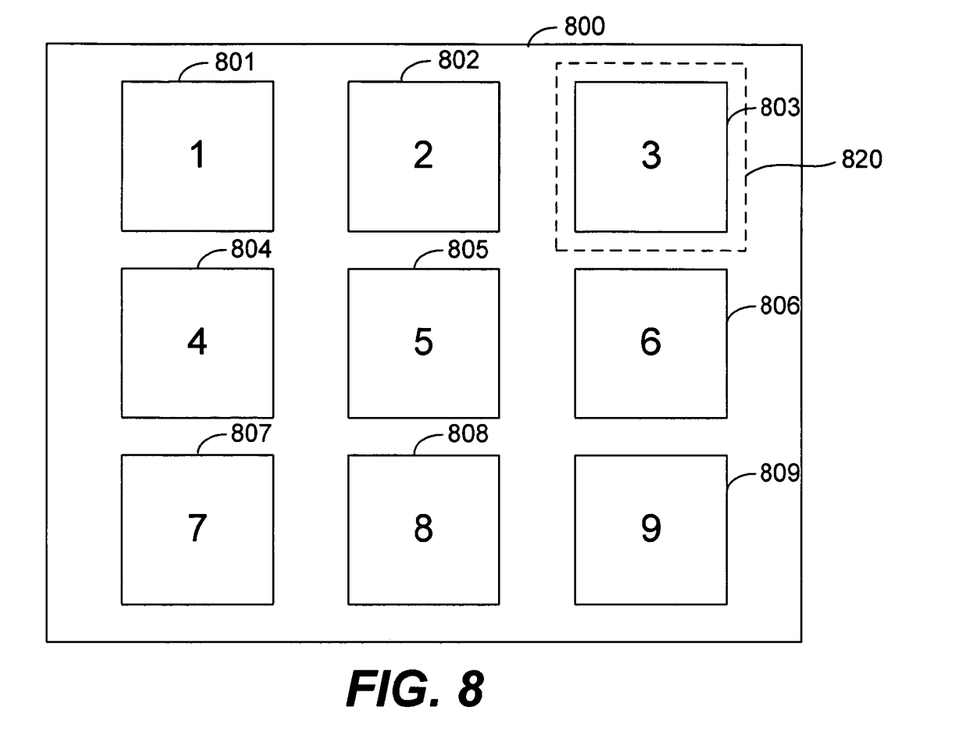
FIG. 8 shows an example of a display that can be used by the method illustrated in FIG. 7 to present different portions of a program for a user's selection.

As noted earlier, a chapter can be highlighted to allow the user to select one of the chapters from which playback should be begun 728. Thus, the user is allowed to make a selection 732 and a determination is made as to whether the user actually made a selection 736. If no selection was made by the user, then the process repeats so as to display additional chapters. Thus, the pickup on the DVD player is advanced to the next chapter location on the DVD disk and information is gathered for a segment for the next chapter. This process is repeated for additional chapters 803, 804, 805, 806, 807, 808, and 809. If no additional chapters exist for display, then the existing chapter graphics can remain while the highlighter 820 is cycled through them so as to provide a user with easy selection by pressing the enter key of the remote control transmitter unit. Once a chapter is selected, playback can be initiated from that chapter point of the movie in normal playback mode 740. The pickup of the DVD player would simply need to be positioned at that chapter location on the DVD disc.

Figure 9:
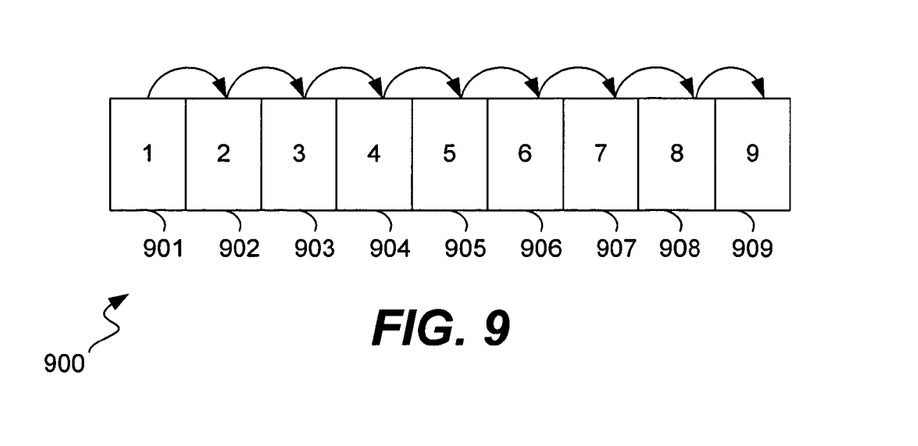
FIG. 9 shows a sample DVD datastream and order of display of the data in the datastream according to the method in FIG. 7.

FIG. 9 shows an illustration of the various datablocks corresponding with the various chapters shown in FIG. 8. The number of chapters could vary depending on the manufacturer of the program. FIG. 9 represents 9 data blocks 901–909. Each datablock corresponds with the data necessary for displaying a first portion of a chapter of the movie or other AV program. The arrows represent how the audio and video for each chapter segment are displayed in sequential order such that the viewer can not only see the video for a portion of a program but also hear the audio associated with that portion of the program.

FIG. 10 illustrates a circuit for implementing the invention according to the flowcharts of FIGS. 1, 4, and 7. In circuit 1000, a DVD disc 1001 is shown coupled to a disk controller 1005. Typically a pickup will be used as a transducer to input the data from a DVD disc, for example. The disk controller is coupled to a track buffer 1010 which stores data for the presentation being displayed. This information can then be decoded by the processor. For example, the processor can separate selected chunks of data corresponding with the selected presentation for display. Similarly, the processor can be used to convert an MPEG encoded datastream to a format suitable for output. Information is conveyed from the track buffer to a stream demultiplexer 1014 in which the various audio and video streams are demultiplexed. These demultiplexed streams are subsequently conveyed to audio controller 1020 and video controller 1024. A display 1200 receives data from the video controller and audio controller to display the presentation. A processor 1016 controls the implementation of the flowcharts described above through software. For example, the processor operates as a selector to select the points in time occurring during a movie in order to playback chapter segments as described above. The processor is coupled to a memory such as RAM 1018. The user can provide input to the circuit through the use of a transmitter 1034, such as a remote control associated with a DVD player. The output from the transmitter is directed to a receiver 1030 which is coupled to the processor 1016. This circuit builds upon the circuit shown on page 135 of "DVD Demystified" by Jim Taylor, McGraw Hill publisher, copyright 1998, the entire content of which is hereby incorporated by reference in its entirety for all that it discloses and for all purposes.

It is thought that the apparatuses and methods of the embodiments of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An apparatus to play an audio/video datastream, said apparatus comprising:
   an input to receive the audio and video datastream, said datastream comprising information for a plurality of different audio/video programs, wherein
      each of the plurality of different audio/video programs comprises a video portion and an audio portion associated only with the video portion, and
      each of the plurality of different audio/video programs is independently actionable by a user;
   a decoding circuit configured to decode said datastream so as to output a signal for displaying a first presentation comprising a first video portion and a first audio portion associated with the first video portion;
   a selection circuit operable to re-configure said decoding circuit such that said decoding circuit is configured to decode said datastream so as to output a signal for displaying a second presentation comprising a second video portion and a second audio portion associated with the second video portion concurrent with the displaying of the first presentation; and
   a receiver configured to receive during use a signal from a user that directly selects which of said first or said second presentation is a desired presentation to display, wherein during the concurrent displaying of the first and the second presentations, the first audio portion and the second audio portions are concurrently output by the apparatus.

2. A method of selecting from a plurality of different audio/video programs each having a video portion and an associated audio portion, a desired presentation of the selected audio/video programs, said method comprising:
   receiving a datastream comprising information for the plurality of different audio/video programs, wherein
      each of the plurality of different audio/video programs comprises a video portion and an audio portion associated only with the video portion, and
      each of the plurality of different audio/video programs is independently actionable by a user;
   displaying on a display in normal playback mode a first selected audio video program comprising a first video portion and a first audio portion associated only with the first video portion;
   displaying on said display in normal playback mode a second audio video program comprising a second video portion and a second audio portion associated only with the second video portion concurrent with the displaying of the first audio video program wherein during the concurrent displaying of the first and the second audio video programs, the first audio and the second audio portions are concurrently output; and
   permitting a user to select directly either said first audio video program or said second audio video program.

3. The method as described in claim 2 wherein said displaying on a display in normal playback mode a segment of a first presentation comprises displaying a segment of said first audio video program for a predetermined period of time.

4. The method as described in claim 3 and further comprising displaying each selected audio video program on a different segment of said display.

5. The method as described in claim 3 and further comprising:

converting a portion of said first audio video program to a graphics format; and displaying said graphics format on said display so as to represent said first audio video program while displaying on said display in normal playback mode said segment of said second audio video program.

6. The method as described in claim 5 and further comprising:
converting portions of all of said audio video programs to graphics format;
displaying all of said graphics formats on said display;
indicating to a user during use a particular one of said displayed audio video programs; and
allowing the user to select a preferred audio video program.

7. The method as described in claim 6 and wherein said indicating comprises:
cycling through each of said displayed audio video programs so as to indicate to the user each audio video program and so as to allow the user to select an audio video program when said presentation is indicated.

8. The method as described in claim 2 wherein said displaying of said second audio video program displays a segment of said video portion and associated audio portion that follows in time said segment of said video portion and associated audio portion displayed by said displaying of said first audio video program.

9. The method as described in claim 2 wherein said displaying of said second audio video program displays a segment of said video portion and associated audio portion that is contemporaneous in time with said segment of said video portion and associated audio portion displayed by said displaying of said first audio video program.

10. The method as described in claim 2 wherein said displaying of said second audio video program displays a segment of said video portion and associated audio portion that overlaps in time with said segment of said video portion and associated audio portion displayed by said displaying of said first audio video program.

11. The method as described in claim 2 wherein said datastream comprises video objects interleaved as blocks such that each interleaved block contains data for one of said plurality of different audio video programs.

* * * * *